(12) United States Patent
Park

(10) Patent No.: US 11,347,127 B2
(45) Date of Patent: May 31, 2022

(54) LIQUID LENS

(71) Applicant: LG INNOTEK CO., LTD., Seoul (KR)

(72) Inventor: Seung Ryong Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 243 days.

(21) Appl. No.: 16/480,781

(22) PCT Filed: Jan. 26, 2018

(86) PCT No.: PCT/KR2018/001184
§ 371 (c)(1),
(2) Date: Jul. 25, 2019

(87) PCT Pub. No.: WO2018/139897
PCT Pub. Date: Aug. 2, 2018

(65) Prior Publication Data
US 2020/0004104 A1  Jan. 2, 2020

(30) Foreign Application Priority Data
Jan. 26, 2017 (KR) .................. 10-2017-0012985

(51) Int. Cl.
*G02F 1/29* (2006.01)
*G03B 5/00* (2021.01)
*G03B 13/18* (2021.01)

(52) U.S. Cl.
CPC .............. *G02F 1/29* (2013.01); *G02F 1/294* (2021.01); *G02F 2201/12* (2013.01); *G02F 2202/16* (2013.01); *G03B 5/00* (2013.01); *G03B 13/18* (2013.01); *G03B 2205/00* (2013.01)

(58) Field of Classification Search
CPC .............. G02F 1/29; G02F 1/294; G02B 3/14
See application file for complete search history.

(56) References Cited

U.S. PATENT DOCUMENTS

| 2006/0126190 | A1  | 6/2006  | Berge et al. |
| 2007/0146895 | A1  | 6/2007  | Oh et al. |
| 2007/0163875 | A1  | 7/2007  | Van Der Meer et al. |
| 2010/0284091 | A1* | 11/2010 | Okamoto ........... G02B 13/0075 359/665 |

(Continued)

FOREIGN PATENT DOCUMENTS

| JP | 2000-356750 A | 12/2000 |
| JP | 2006-146235 A | 6/2006 |
| JP | 2007-212943 A | 8/2007 |

(Continued)

*Primary Examiner* — Jessica M Merlin
(74) *Attorney, Agent, or Firm* — Birch, Stewart, Kolasch & Birch, LLP

(57) ABSTRACT

A liquid lens includes a first plate including a cavity in which a conductive liquid and a non-conductive liquid are disposed; a first electrode placed under the first plate; a second electrode placed on the first plate; a second plate on the second electrode; and a third plate under the first electrode, wherein a region of the second plate, which is disposed on the conductive liquid, includes a first region having a first thickness and including an optical axis, and a second region extending from the first region and having a second thickness, and the first thickness is greater than the second thickness.

16 Claims, 6 Drawing Sheets

(56) References Cited

U.S. PATENT DOCUMENTS

2012/0113525 A1  5/2012 Kong et al.
2015/0070779 A1* 3/2015 Karam ................ G02B 3/0056
                                              359/665

FOREIGN PATENT DOCUMENTS

| JP | 2007-536591 A | 12/2007 |
| JP | 2008-107826 A | 5/2008 |
| JP | 2008-191647 A | 8/2008 |
| JP | 2009-186595 A | 8/2009 |
| JP | 2010-532010 A | 9/2010 |
| JP | 2012-68624 A | 5/2012 |
| KR | 10-2007-0008169 A | 1/2007 |
| KR | 10-0723244 B1 | 5/2007 |
| KR | 10-2007-0095525 A | 10/2007 |
| KR | 10-2008-0064237 A | 7/2008 |
| KR | 10-0992090 B1 | 11/2010 |
| KR | 10-2016-0063238 A | 6/2016 |
| WO | WO 2007/058451 A1 | 5/2007 |
| WO | WO 2008/015184 A1 | 2/2008 |
| WO | WO-2008082025 A1 * | 7/2008 |
| WO | WO 2010/114254 A2 | 10/2010 |

\* cited by examiner

[FIG. 1a]
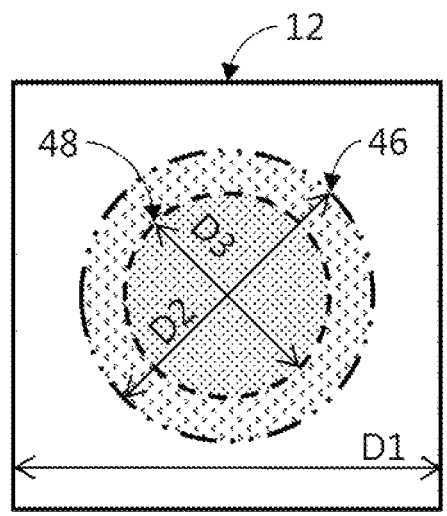
[FIG. 1b]
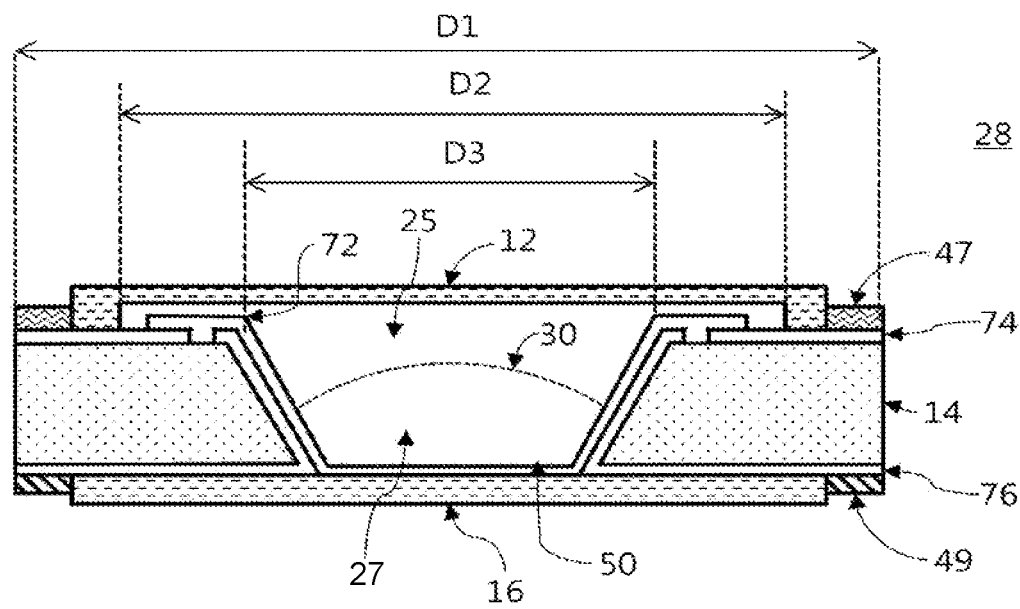

[FIG. 2a]
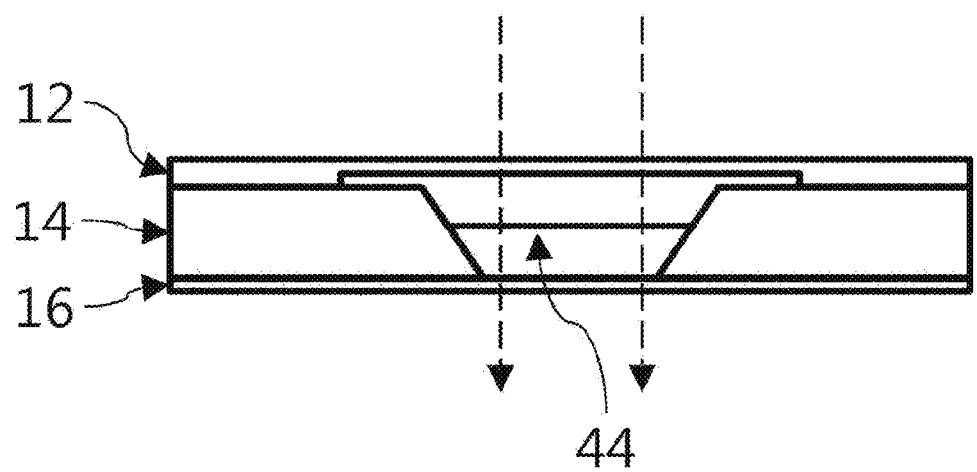
[FIG. 2b]
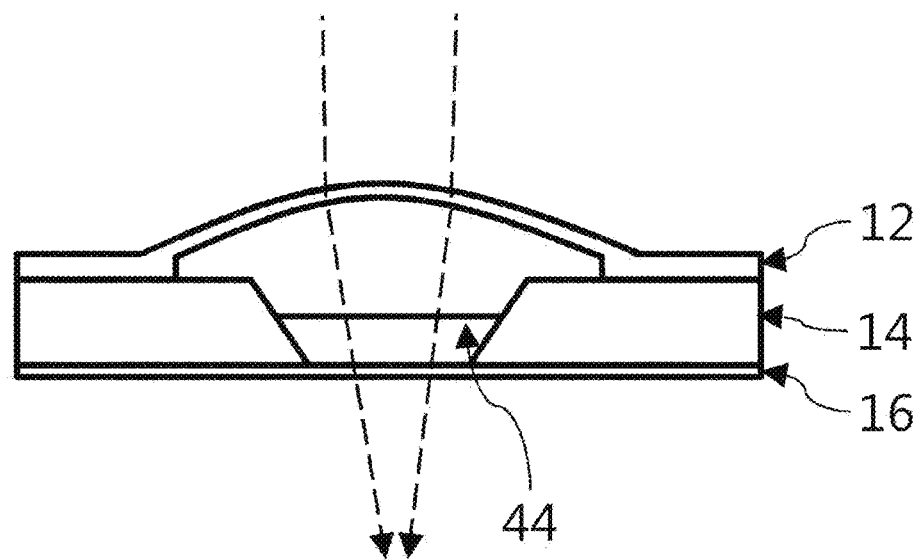

[FIG. 3a]
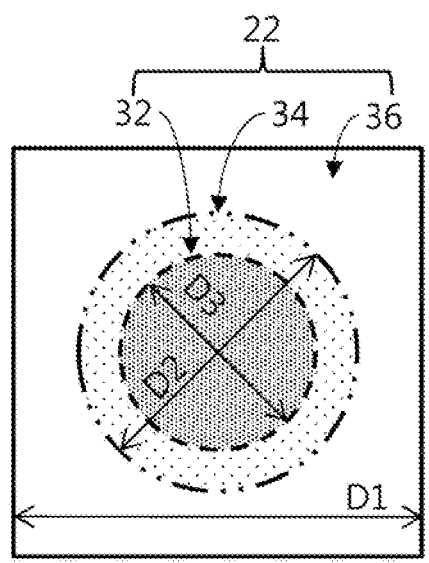
[FIG. 3b]
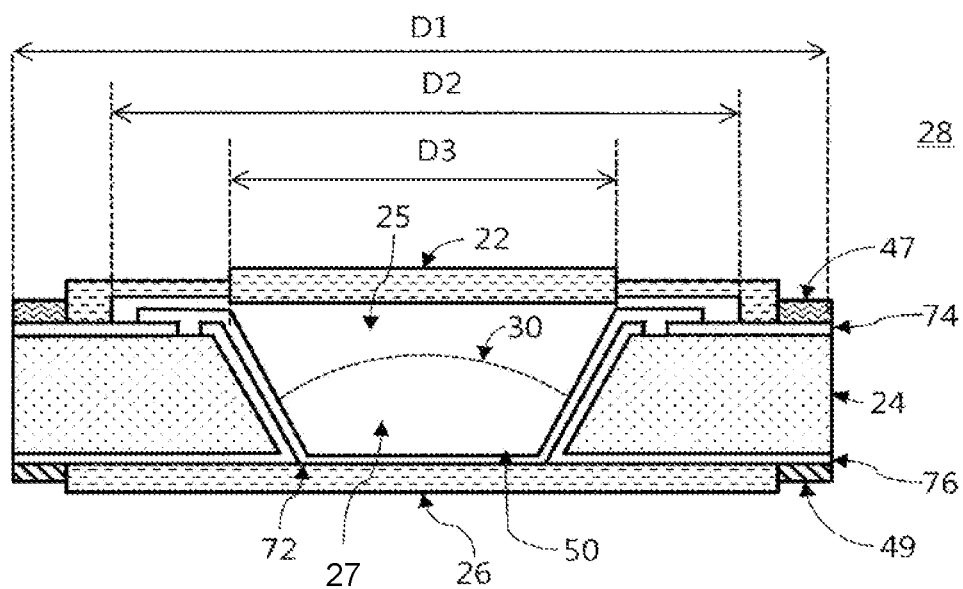

[FIG. 4a]
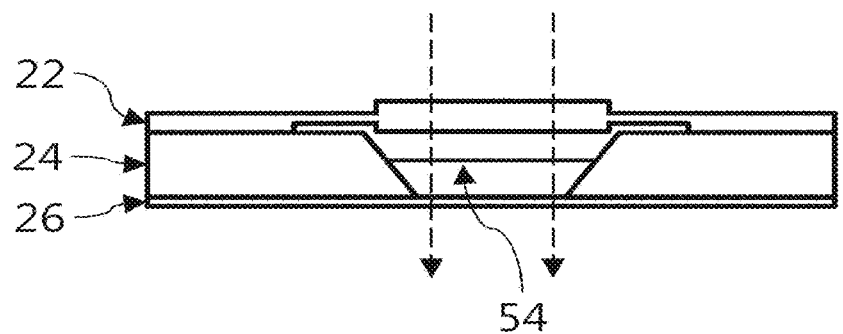
[FIG. 4b]
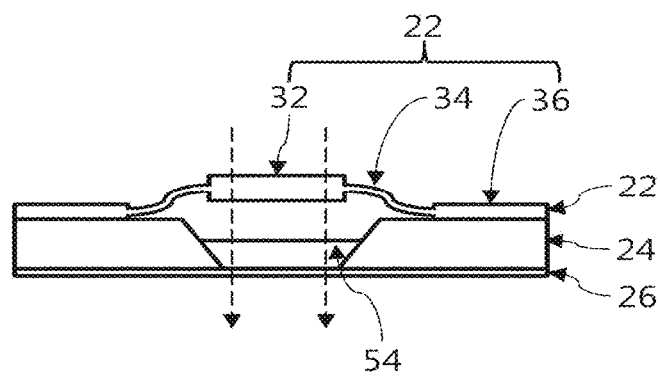
[FIG. 5a]
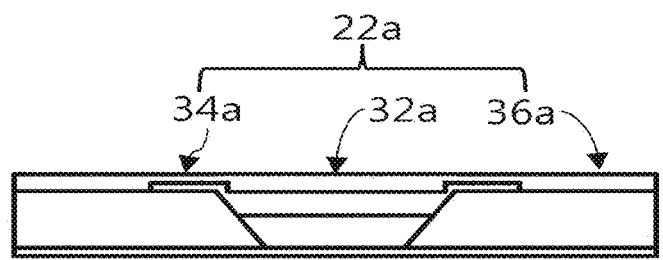

[FIG. 5b]
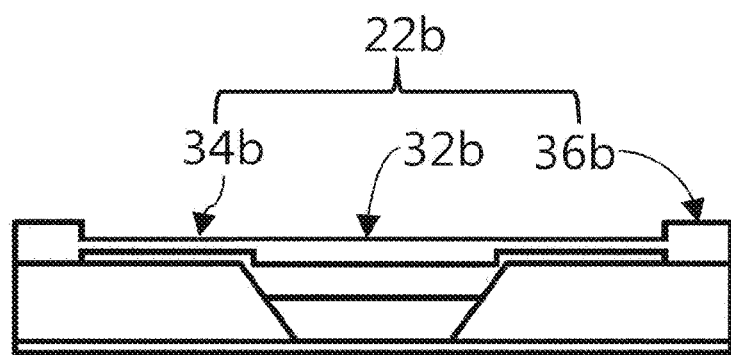
[FIG. 5c]
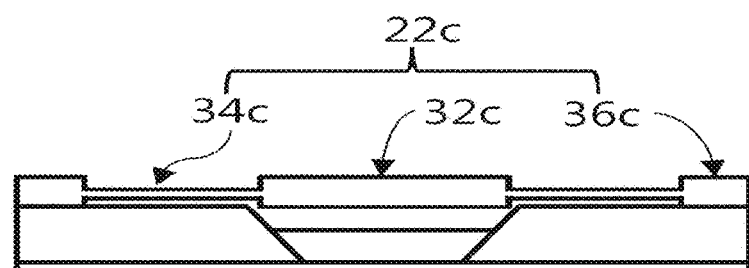
[FIG. 5d]
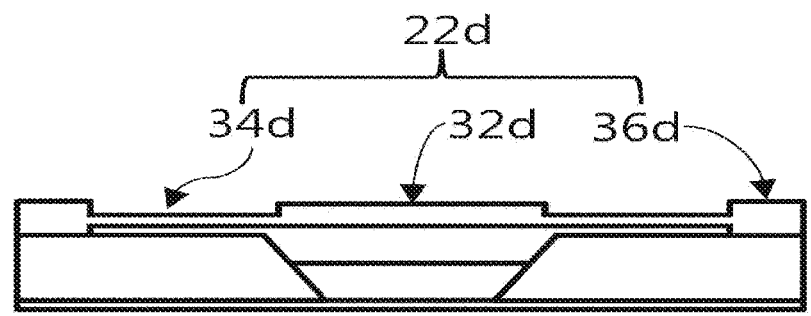

[FIG. 5e]
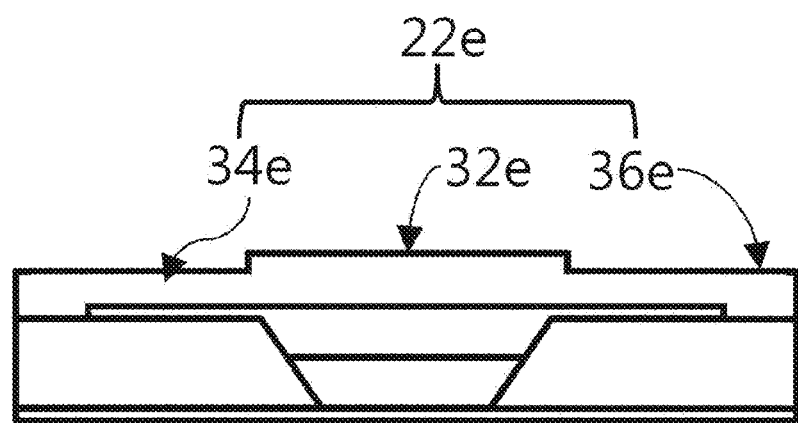

LIQUID LENS

CROSS REFERENCE TO RELATED APPLICATIONS

This application is the National Phase of PCT International Application No. PCT/KR2018/001184, filed on Jan. 26, 2018, which claims priority under 35 U.S.C. 119(a) to Patent Application No. 10-2017-0012985, filed in the Republic of Korea on Jan. 26, 2017, all of which are hereby expressly incorporated by reference into the present application.

TECHNICAL FIELD

The present disclosure relates to a liquid lens. More particularly, the present disclosure relates to a lens capable of reducing the occurrence of a change in diopter due to the deformation of a structure, which contains a liquid included in a liquid lens, during thermal expansion of the liquid according to a change in temperature.

BACKGROUND ART

People who use portable devices demand optical devices that have high resolution, are small, and have various photographing functions (an optical zoom-in/zoom-out function, an autofocus (AF) function, a hand-tremor compensation or optical image stabilization (OIS) function, etc.). Such photographing functions may be realized by directly moving a plurality of lenses that are combined. In the case in which the number of lenses is increased, however, the size of an optical device may be increased. The autofocus and hand-tremor compensation functions are performed by tilting or moving a lens module including a plurality of lenses, which are fixed to a lens holder in the state in which the optical axes of the lenses are aligned, along the optical axis or in a direction perpendicular to the optical axis. An additional lens moving apparatus is used to move the lens module. However, the lens moving apparatus consumes a lot of power, and an additional cover glass needs to be provided separately from the camera module in order to protect the lens moving apparatus, thus leading to an increase in the overall thickness of an optical device. Therefore, research has been conducted on a liquid lens configured to electrically adjust the curvature of an interface between two kinds of liquid in order to perform autofocus and hand-tremor compensation functions.

DISCLOSURE

Technical Problem

The present disclosure may provide a lens enabling adjustment of a focal length using electrical energy and capable of reducing the occurrence of a change in diopter due to the deformation of a structure, which contains a liquid included in the lens, according to a change in temperature, and a camera module including the lens.

In addition, the present disclosure may provide a liquid lens, in which the thickness of a glass layer, which contains a liquid and provides a transparent lens region, is increased, thereby reducing the occurrence of a change in diopter due to the bending of the glass layer in the lens region even when the internal liquid thermally expands in a temperature-dependent manner.

In addition, the present disclosure may provide a camera module capable of reducing the occurrence of a change in diopter of a liquid lens according to a change in temperature, thereby reducing a temperature-dependent distortion coefficient in a lens assembly, which includes a plurality of lenses including the liquid lens, and consequently facilitating distortion correction.

However, the objects to be accomplished by the disclosure are not limited to the above-mentioned objects, and other objects not mentioned herein will be clearly understood by those skilled in the art from the following description.

Technical Solution

In one embodiment, a liquid lens may include a first plate including a cavity in which a conductive liquid and a non-conductive liquid are disposed, a first electrode disposed under the first plate, a second electrode disposed on the first plate, a second plate disposed on the second electrode, and a third plate disposed under the first electrode, wherein a region of the second plate, which is disposed on the conductive liquid, may include a first region having a first thickness and encompassing an optical axis and a second region extending from the first region and having a second thickness, and the first thickness may be larger than the second thickness.

Alternatively, the second plate may further include a third region having a third thickness and coupled to the first plate, and the second region may be disposed between the first region and the third region.

Alternatively, the third thickness may be larger than the second thickness.

Alternatively, the third thickness may be equal to or larger than the first thickness.

Alternatively, the third thickness may be equal to or smaller than the first thickness.

Alternatively, the cross-sectional area of the cavity may gradually increase in the direction from the third plate toward the second plate, and the cavity may include an inclined surface that is inclined at an angle of 55 to 65 degrees.

Alternatively, the conductive liquid may be in contact with the second plate.

Alternatively, the second plate may include an inner surface, which is in contact with one of the conductive liquid or the non-conductive liquid, and an outer surface formed opposite the inner surface, and at least one of the inner surface or the outer surface may be uneven.

Alternatively, the first region may protrude further than the second region in the inner surface.

Alternatively, the first region may protrude further than the second region in the outer surface.

Alternatively, the first region may protrude further than the second region in the outer surface and the inner surface.

Alternatively, the first region and the second region may be even and the bonding region may protrude in the inner surface or the outer surface.

Alternatively, the second plate may include an inner surface, which is in contact with one of the conductive liquid or the non-conductive liquid, and an outer surface formed opposite the inner surface. One of the inner surface and the outer surface may be uneven, and the other one may be even.

Alternatively, the planar area of the first region may be larger than or equal to that of the open region.

In addition, the second plate may be thicker than the third plate, and the third plate may be even.

In addition, the thickness of the second plate may be greater than 1 mm, and the thickness of the second region may be less than 1 mm and equal to or greater than 50% of the thickness of the second plate.

In another embodiment, a liquid lens may include a first plate including a cavity in which a conductive liquid and a non-conductive liquid are disposed, a first electrode disposed under the first plate, a second electrode disposed on the first plate, a second plate disposed on the second electrode, and a third plate disposed under the first electrode, wherein the thickness of a region of the second plate, which is disposed on the conductive liquid, in a direction parallel to an optical axis may be smaller than the thickness of a region of the second plate, which is coupled to the first plate, in a direction parallel to the optical axis.

In still another embodiment, a liquid lens may include a second plate and a third plate, which are transparent, a first plate disposed between the second plate and the third plate and including an open region having a predetermined inclined surface, a cavity defined by the second plate, the third plate, and the open region, and two liquids charged in the cavity and having different properties from each other, wherein the second plate may include a bonding region bonded to the first plate, a center region formed corresponding to the open region, and a peripheral region spaced apart from the first plate and located between the bonding region and the center region, and the thickness of the center region may be larger than the thickness of the peripheral region so that a degree of warping of the center region in response to a change in temperature is small.

However, the above aspects of the present disclosure are only a part of the exemplary embodiments of the present disclosure, and various embodiments based on the technical features of the present disclosure may be devised and understood by those skilled in the art from the following detailed description of the present disclosure.

Advantageous Effects

The effects of a device according to the disclosure will be described below.

The present disclosure provides a liquid lens in which a change in diopter in response to a change in temperature is small.

In addition, the present disclosure provides a camera module capable of reducing a temperature-dependent distortion coefficient in a lens assembly including a liquid lens and consequently facilitating distortion correction.

However, the effects achievable through the disclosure are not limited to the above-mentioned effects, and other effects not mentioned herein will be clearly understood by those skilled in the art from the following description.

DESCRIPTION OF DRAWINGS

FIGS. 1a and 1b illustrate a first example of a liquid lens.

FIGS. 2a and 2b illustrate the characteristics of the liquid lens shown in FIGS. 1a and 1b according to a change in temperature.

FIGS. 3a and 3b illustrate a second example of the liquid lens.

FIGS. 4a and 4b illustrate the characteristics of the liquid lens shown in FIGS. 3a and 3b according to a change in temperature.

FIG. 5a illustrates a third example of the liquid lens.
FIG. 5b illustrates a fourth example of the liquid lens.
FIG. 5c illustrates a fifth example of the liquid lens.
FIG. 5d illustrates a sixth example of the liquid lens.
FIG. 5e illustrates a seventh example of the liquid lens.

BEST MODE

Reference will now be made in detail to the preferred embodiments, examples of which are illustrated in the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure covers all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

With relation to a camera module that is mounted in a small-sized portable device and includes a plurality of lenses, it is not easy to realize an optical zoom-in/zoom-out function, an autofocus (AF) function, and a hand-tremor compensation or optical image stabilization (OIS) function through a method of changing a focal length by adjusting the distance between the lenses. One of the methods for solving the above problem is to make a lens using liquid, rather than using hard transparent glass or plastic. In the case in which a lens is made of liquid, the focal length of the lens may be adjusted through an electrowetting phenomenon. A liquid lens using an electrowetting phenomenon may reduce the size of a camera module compared to a configuration in which a focal length is adjusted by moving a lens (adjusting the distance between lenses), and may consume a small amount of power compared to a configuration in which a lens is mechanically moved using a motor or the like.

FIGS. 1a and 1b illustrate a first example of the liquid lens. Specifically, FIG. 1a is a top view of the first example of the liquid lens, and FIG. 1b is a cross-sectional view of the first example of the liquid lens.

Referring to FIGS. 1a and 1b, the liquid lens may include two different liquids, a first plate 14, and an electrode. The two liquids 25 and 27 included in the liquid lens may include a conductive liquid and a non-conductive liquid. The first plate may include a cavity 50 in which the conductive liquid and the non-conductive liquid are disposed. The cavity 50 may include an inclined surface. The electrode may be disposed on the first plate 14, or may be disposed under the first plate. The liquid lens may further include a second plate 12, which may be disposed on (or under) the electrode. In addition, the liquid lens may further include a third plate 16, which may be disposed under (or on) the electrode. As illustrated, one embodiment of the liquid lens 28 may include an interface 30 formed by the two different liquids 25 and 27. In addition, the liquid lens 28 may include at least one substrate 47 and 49, which supplies a voltage to the liquid lens 28. The corners of the liquid lens 28 may be thinner than the center portion of the liquid lens 28.

The liquid lens 28 may include two different liquids, namely the conductive liquid 25 and the non-conductive liquid 27, and the curvature and the shape of the interface 30 formed by the two liquids may be adjusted by varying the driving voltage supplied to the liquid lens 28. The driving voltage supplied to the liquid lens 28 may be transmitted through the first substrate 49 and the second substrate 47. The first substrate 49 may serve to transmit four distinct individual driving voltages, and the second substrate 47 may serve to transmit a common voltage. The voltages supplied through the second substrate 47 and the first substrate 49 may be applied to a plurality of electrodes 74 and 76 exposed at the respective corners of the liquid lens 28.

In addition, the liquid lens 28 may include a third plate 16 and a second plate 12, which include a transparent material, and may further include a first plate 14, which is disposed between the third plate 16 and the second plate 12 and includes an open region having a predetermined inclined surface.

The second plate 12 may have a rectangular shape having a first width D1. The second plate 12 may be in contact with and bonded to the first plate 14 in the bonding region near the edge thereof. The first plate 14 may encompass a diameter D2 of a peripheral region 46, which is greater than the diameter D3 of a large open region 48 having the inclined surface. The upper portion of the first plate 14 may be partially exposed so as to define a cavity 42. The reason for this is that some of the electrode patterns formed on the first plate 14 need to be exposed to the cavity 42. Accordingly, according to the embodiment, the second plate 12 may include a peripheral region 46, which has a diameter D2 greater than the diameter D3 of the large open region in the first plate 14 and is spaced apart from the first plate 14.

The actual effective lens region of the liquid lens 28 may be much smaller than the diameter D3 of the large open region in the first plate 14. For example, in the case in which light is actually transmitted through a path defined by a small-diameter region about the center portion of the liquid lens 28, the diameter D2 of the center region of the second plate 12 may be smaller than the diameter D3 of the large open region in the first plate 14.

In addition, the liquid lens 28 may include a cavity 50, which is defined by the third plate 16, the second plate 12, and the open region in the first plate 14. Here, the cavity 50 may be filled with two liquids 25 and 27 having different properties (e.g. a conductive liquid and a non-conductive liquid), and an interface 30 may be formed between the two liquids 25 and 27 having different properties.

Further, at least one of the two liquids 25 and 27 included in the liquid lens 28 may be conductive, and the liquid lens 28 may further include an insulation layer 72, which is disposed on the two electrodes 74 and 76, which are disposed on and under the first plate 14, and on the inclined surface, which may come into contact with the conductive liquid. Here, the insulation layer 72 may cover one (e.g. the second electrode 76) of the two electrodes 74 and 76, and may expose a portion of the other one (e.g. the first electrode 74) of the two electrodes 74 and 76 so that electrical energy is applied to the conductive liquid (e.g. 25). Here, the first electrode 74 may include at least one electrode sector, and the second electrode 76 may include two or more electrode sectors. For example, the second electrode 76 may include a plurality of electrode sectors, which are sequentially disposed in the clockwise direction about the optical axis.

One or two or more substrates 47 and 49 may be connected to the two electrodes 74 and 76 included in the liquid lens 28 in order to transmit a driving voltage thereto. The curvature and the inclination of the interface 30 formed in the liquid lens 28 may be changed in response to the driving voltage, whereby the focal length of the liquid lens 28 may be adjusted.

Referring to FIG. 1b, the center portion of the second plate 12, which corresponds to the open region 48, and the peripheral region 46 thereof may have the same thickness and may be even. The thickness of each of the center portion and the peripheral region 46 of the second plate 12 may be less than the thickness of the bonding region near the edge thereof.

The first plate 14 may include an open region 48 having an inclined surface, and the diameter D3 of the large open region 48 may vary depending on the field of view (FOV) required for the liquid lens or the role of the liquid lens in the camera module. The open region 48 may be formed in the shape of a hole having a circular cross-section. The inclined surface of the open region 48 may be inclined at an angle of 55 to 65 degrees. The interface 44 formed by the two liquids may move along the inclined surface of the open region 48.

FIGS. 2a and 2b illustrate the characteristics of the liquid lens shown in FIGS. 1a and 1b according to a change in temperature. Specifically, FIG. 2a illustrates the liquid lens at room temperature, and FIG. 2b illustrates the liquid lens at a high temperature.

As described above, the cavity, which is defined by the second plate 12, the first plate 14, and the third plate 16, is filled with two liquids having different properties. The liquids expand with an increase in temperature (e.g. thermal expansion).

The two liquids charged in the cavity may include an electrolytic (or conductive) liquid and a non-electrolytic (or non-conductive) liquid. The degree of thermal expansion of a liquid may be larger than that of a solid. As the temperature of a material increases, the movement of molecules becomes more active, and the distance between the molecules increases, which may result in an increase in the volume of the material. In particular, since molecules of a liquid move more freely than molecules of a solid, the liquid may thermally expand more than the solid for the same change in temperature. A representative example of an electrolytic (conductive) liquid used in a liquid lens is water ($H_2O$). In the case of water, the volume thereof increases when the temperature rises within the range of 4° C. or higher, but the volume thereof decreases when the temperature rises within the range below 4° C. The coefficient of thermal expansion of water is known to be about 1.8 (unit: $10^{-5}/°$ C.).

Referring to FIG. 2a, if there is no change in the volume of the two liquids in the cavity at room temperature, the light incident through the second plate 12 may be refracted by the interface 44 formed by the two liquids in the cavity, and may pass through the third plate 16. In this case, it is possible to control the liquid lens in a desired direction by applying electric energy to the liquid lens to change the curvature of the interface 44.

Referring to FIG. 2b, the second plate 12 may swell due to a change in the volume of the two liquids charged in the cavity at a high temperature. Since the center portion and the peripheral region of the second plate are not bonded to the first plate 14 and the thickness of each of the central portion and the peripheral region of the second plate is relatively small, the second plate 12 may warp in response to the increase in the volume of the two liquids due to a change in temperature.

On the other hand, the third plate 16 may not swell despite the change in temperature. After the first plate 14, on which a plurality of electrode patterns is disposed, is secured on the third plate 16, an insulation layer (not shown) may be formed so as to prevent the electrode patterns from being exposed to the cavity. For example, one of two electrode patterns may be covered with the insulation layer, and only the other one may be exposed, thereby preventing the properties of the two liquids in the cavity from being changed. Even when the two liquids thermally expand according to a change in temperature, the third plate 16 may not swell, but the second plate 12, which has low rigidity, may swell due to the insulation layer formed on the first plate 14 and the third plate 16.

When the second plate 12 swells, light incident through the second plate 12 may be refracted by the curvature generated in the second plate 12, separately from the interface 44, the curvature of which is controlled using electrical energy. In this case, the curvature generated in the second plate 12 may not be considered when designing the liquid lens. Even when the coefficients of thermal expansion of the two liquids according to a change in temperature are accurately known, the curvature of the second plate 12 may not be generated uniformly. For example, depending on the bonding strength between the second plate 12 and the first plate 14, the portion having the lower strength may swell first. As described above, the second plate 12, which is not maintained uniformly, may cause a change in the diopter of the liquid lens according to a change in temperature, and may make it difficult to accurately predict the change in diopter.

FIGS. 3a and 3b illustrate a second example of the liquid lens. Specifically, FIG. 3a is a top view of the second example of the liquid lens, and FIG. 3b is a cross-sectional view of the first example of the liquid lens. For convenience of description, a description of the constituent elements that are substantially the same as those of the liquid lens described above with reference to FIG. 1b will be omitted.

Referring to FIGS. 3a and 3b, the liquid lens may include a second plate 22 and a third plate 26, which are transparent, a first plate 24, which is disposed between the second plate 22 and the third plate 26 and includes an open region having a predetermined inclined surface, a cavity 50, which is defined by the second plate 22, the third plate 26, and the open region, and two liquids 25 and 27, which are charged in the cavity 50 and have different properties. Here, the two liquids having different properties may form an interface 30 therebetween, and the location and the curvature of the interface 30 may be changed by varying the electrical energy (e.g. voltage or the like) applied to the liquid lens.

The second plate 22 may have a rectangular shape having a first width D1. Specifically, the second plate 22 may include a bonding region for bonding with the first plate 24, a center region 32 corresponding to the open region, and a peripheral region 34, which is spaced apart from the first plate 24 and is located between the bonding region and the center region 32.

The second plate 22 may be in contact with and bonded to the first plate 24 in the bonding region near the edge thereof, and may include the center region 32, which corresponds to the diameter D3 of the large open region in the first plate 24. Although it is illustrated in FIG. 3b that the open region in the first plate 24 and the center region 32 have the same diameter (D3), the diameter/area of the center region 32 may be greater than the diameter/area of the open region in the first plate 24. The open region in the first plate 24 is a region of the liquid lens that receives light. When the center region 32 of the second plate 22 is smaller than the open region in the first plate 24, a lens active area of the liquid lens (an area thereof that receives light) may be reduced.

The center region 32 and the peripheral region 34 of the second plate 22 may be spaced apart from the first plate 24. When the center region 32 and the peripheral region 34 are spaced apart from the first plate 24, the upper portion of the first plate 24 may be partially exposed so as to define a cavity 50. The reason for this is that some of the electrode patterns formed on the first plate 24 need to be exposed to the cavity 50. The peripheral region 34 may have a diameter D2 that is greater than the open region in the first plate 24.

Referring to FIG. 3b, the center region 32 of the second plate 22, which corresponds to the open region in the first plate 24, and the peripheral region 34 thereof may have different thicknesses from each other. Further, the second plate 22 may be uneven, rather than being even. Here, the configuration in which the second plate 22 is uneven may be a configuration in which the entire surface of the second plate is not even and a stepped portion is present between the center region 32 and the peripheral region 34. In particular, the center region 32 of the second plate 22 may be thicker than the peripheral region 34 thereof. When the center region 32 of the second plate 22 is thicker than the peripheral region 34 thereof, the degree to which the second plate is warped according to a change in temperature may be small.

The first plate 24 may include an open region having an inclined surface, and the diameter D3 of the large open region may vary depending on the field of view (FOV) required for the liquid lens or the role of the liquid lens in the camera module. The open region may be formed in the shape of a hole having a circular cross-section. The inclined surface of the open region may be inclined at an angle of 55 to 65 degrees. The interface 30 formed by the two liquids may move along the inclined surface of the open region.

A bonding region 36 near the edge of the second plate 22 may be thicker than the peripheral region 34 thereof. However, the thickness of the bonding region 36 of the second plate 22 and the thickness of the center region 32 thereof may be the same as each other, or may be different from each other. As the thickness of the center region 32 of the second plate 22 increases, a change in diopter according to a change in temperature may decrease. Further, the thickness of the second plate 22 may be equal to or greater than 15% to 20% of the overall thickness of the liquid lens 28. For example, in the case in which the direction in which the focal length of the liquid lens 28 is changed is opposite the direction in which the focal lengths of all the other lenses are changed, it is possible to offset the directions by adjusting the thickness of the second plate 22 of the liquid lens 28. Here, as the thickness of the second plate 22 decreases, the change becomes larger, and as the thickness of the second plate 22 increases, the change becomes smaller.

Furthermore, the second plate 22 may include an inner surface, which is in contact with one of the two liquids, and an outer surface, which is formed opposite the inner surface. Referring to FIG. 3b, the center region 32 of the second plate 22 may protrude in the inner surface as well as the outer surface. The second plate 22 may include a first region (e.g.

a center region), which is disposed on the conductive liquid, has a first thickness, and encompasses the optical axis, and a second region (e.g. a peripheral region), which extends from the first region and has a second thickness. In addition, the second plate 22 may further include a third region (e.g. a bonding region), which is coupled to the first plate 24. The second region of the second plate 22 may be disposed between the first region and the third region.

FIGS. 4a and 4b illustrate the characteristics of the liquid lens shown in FIGS. 3a and 3b according to a change in temperature. Specifically, FIG. 4a illustrates the liquid lens at room temperature, and FIG. 4b illustrates the liquid lens at a high temperature.

As described above, the cavity, which is defined by the second plate 22, the first plate 24, and the third plate 26, is filled with two liquids having different properties. The liquids may expand with an increase in temperature (e.g. thermal expansion).

Referring to FIG. 4a, if there is no change in the volume of the two liquids in the cavity at room temperature, the light incident through the second plate 22 may be refracted by the interface 30, 54 formed by the two liquids in the cavity, and may pass through the third plate 26. In this case, it is possible to control the liquid lens in a desired direction by applying electric energy to the liquid lens to change the curvature of the interface 30.

Referring to FIG. 4b, the second plate 22 may swell due to a change in the volume of the two liquids charged in the cavity at a high temperature. Since the center region 32 and the peripheral region 34 of the second plate 22 are not bonded to the first plate 24, the second plate 22 may swell due to the expansion of the two liquids charged in the cavity. However, when the second plate 22 swells, the center region 32, which has a relatively large thickness, may be maintained even, and only the peripheral region 34, which has a smaller thickness than the center region 32, may be bent with a certain curvature.

As such, when a curvature is not generated in the center region 32 of the second plate but is generated only in the peripheral region 34, the light transmitted through the center region 32 may not be refracted. That is, if a curvature is not generated in the center region 32 despite the change in temperature, the change in the diopter of the liquid lens in response to a change in temperature may decrease.

On the other hand, the third plate 26 may not swell despite the change in temperature. After the first plate 24, on which a plurality of electrode patterns is disposed, is secured on the third plate 26, an insulation layer (not shown) may be formed so as to prevent the electrode patterns from being exposed to the cavity. For example, one of two electrode patterns may be covered with the insulation layer, and only the other one may be exposed, thereby preventing the properties of the two liquids charged in the cavity from being changed. Even when the two liquids thermally expand according to a change in temperature, the third plate 26 may not swell, but only the peripheral region 34 of the second plate 22, which has low rigidity, may be bent with a certain curvature due to the insulation layer formed on the first plate 24 and the third plate 26.

When the second plate 22 swells, if the center region 32 is maintained even, the light incident through the second plate 22 may be refracted by the curvature of the interface 30, 54, which is controlled using electrical energy, and thus the control of the lens assembly including the liquid lens may be facilitated. That is, it is not necessary to consider the curvature that may be generated in the second plate 22 according to a change in temperature, thereby greatly reducing the distortion coefficient of the liquid lens.

FIGS. 5a to 5d illustrate various structures of the liquid lens. The following description will focus on differences from the liquid lenses described with reference to FIGS. 1a, 1b, 3a and 3b.

FIG. 5a illustrates a third example of the liquid lens.

As illustrated, the third example of the liquid lens is configured such that a second plate 22a, which is in contact with the first plate, includes an inner surface, which is in contact with the liquid and is uneven, and an outer surface, which is even. In this case, a center region 32a of the second plate 22a may be thinner than a bonding region 36a thereof, and may be thicker than a peripheral region 34a.

FIG. 5b illustrates a fourth example of the liquid lens.

As illustrated, the fourth example of the liquid lens may be configured such that a second plate 22b, which is in contact with the first plate, includes an inner surface which is in contact with the liquid and is uneven, protrudes, or is not flat, and an outer surface, which is uneven, protrudes, or is not flat. A center region 32b and a peripheral region 34b may be even in the outer surface of the second plate 22b, but a center region 32b may protrude further than a peripheral region 34b in the inner surface of the second plate 22a. In the second plate 22b, a bonding region 36b may have the largest thickness, and the center region 32b may be thinner than the bonding region 36b and may be thicker than the peripheral region 34b.

FIG. 5c illustrates a fifth example of the liquid lens.

As illustrated, the fourth example of the liquid lens may be configured such that a second plate 22c, which is in contact with the first plate, includes an inner surface, which is in contact with the liquid and is uneven, and an outer surface, which is uneven. A center region 32c may protrude further than a peripheral region 34c both in the outer surface and in the inner surface of the second plate 22c. In this second plate 22c, the center region 32c and a bonding region 36c may be thicker than the peripheral region 34c. However, the center region 32c may be thicker or thinner than the bonding region 36c, or may have the same thickness as the bonding region 36c.

FIG. 5d illustrates a sixth example of the liquid lens.

As illustrated, the sixth example of the liquid lens may be configured such that a second plate 22d, which is in contact with the first plate, includes an inner surface, which is in contact with the liquid and is even, and an outer surface, in which a center region and a peripheral region are uneven, protrude, or are not flat. In this second plate 22d, the center region 32d may be thinner than a bonding region 36d, and may be thicker than the peripheral region 34d.

As illustrated in FIGS. 5b to 5d, the thickness of the coupling portion between the first plate and the second plate is the largest. Although not illustrated, the inner region (the region that is in contact with the liquid) of the coupling portion between the first plate and the second plate may be even. Further, the upper region of the coupling portion between the first plate and the second plate may protrude higher than the upper portion of the region of the second plate that is in contact with the liquid.

FIG. 5e illustrates a seventh example of the liquid lens.

As illustrated, the seventh example of the liquid lens may be configured such that a second plate 22e, which is in contact with the first plate, includes an inner surface, which is in contact with the liquid and is even, and an outer surface, in which a center region protrudes further than a peripheral region. In this second plate 22e, the center region 32e may be thicker than a bonding region 36e and the peripheral region 34e.

The above-described liquid lens may be included in a camera module. The camera module may include a lens assembly including a liquid lens mounted in a housing and at least one solid lens that may be disposed on the front surface or the rear surface of the liquid lens, an image sensor converting an optical signal transmitted through the lens assembly into an electrical signal, and a control circuit supplying a driving voltage to the liquid lens.

Although only a limited number of embodiments have been described above, various other embodiments are possible. The technical contents of the above-described embodiments may be combined into various forms as long as they are not incompatible with one another, and thus may be implemented in new embodiments.

For example, an optical device (or an optical instrument) including the camera module including the above-described liquid lens may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include the liquid lens. In addition, the optical device may be implemented in a portable device such as, for example, a smartphone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

It will be apparent to those skilled in the art that various changes in form and details may be made without departing from the spirit and the essential characteristics of the disclosure set forth herein. Accordingly, the above detailed description is not intended to be construed as limiting the disclosure in all aspects and to be considered by way of example. The scope of the disclosure should be determined by reasonable interpretation of the accompanying claims, and all equivalent modifications made without departing from the disclosure should be included in the scope of the disclosure.

The invention claimed is:

1. A liquid lens, comprising:
a first plate comprising a cavity in which a conductive liquid and a non-conductive liquid are disposed;
a first electrode disposed under the first plate;
a second electrode disposed on the first plate;
a second plate disposed on the second electrode; and
a third plate disposed under the first electrode,
wherein a region of the second plate, which is disposed on the conductive liquid, comprises:
a first region having a first thickness and encompassing an optical axis, light being transmitted toward the third plate through the first region, which is not coupled to the first plate;
a second region extending from the first region, an entirety of the second region having a second thickness; and
a third region having a third thickness and coupled to the first plate, the second region being disposed between the first region and the third region,
wherein the first thickness is larger than the second thickness, and
wherein the third thickness is larger than the second thickness, and is equal to or larger than the first thickness.

2. The liquid lens according to claim 1, wherein a cross-sectional area of the cavity gradually increases in a direction from the third plate toward the second plate, and
wherein the cavity comprises an inclined surface that is inclined at an angle of 55 to 65 degrees.

3. The liquid lens according to claim 1, wherein the second plate comprises an inner surface, which is in contact with one of the conductive liquid or the non-conductive liquid, and an outer surface formed opposite the inner surface, and
wherein at least one of the inner surface or the outer surface is uneven.

4. The liquid lens according to claim 3, wherein the first region protrudes further than the second region in the inner surface.

5. The liquid lens according to claim 3, wherein the first region and the second region are even and the third region protrudes further than the first region, in the inner surface.

6. The liquid lens according to claim 1, wherein a planar area of the first region is larger than or equal to that of an open region of the first plate.

7. The liquid lens according to claim 1, wherein the second plate is thicker than the third plate.

8. The liquid lens according to claim 1, wherein a thickness of the second plate is greater than 1 mm, and
wherein a thickness of the second region is less than 1 mm and equal to or greater than 50% of the thickness of the second plate.

9. The liquid lens according to claim 1, wherein the second plate comprises an inner surface, which is in contact with one of the conductive liquid or the non-conductive liquid, and an outer surface formed opposite the inner surface, and
wherein the first region of the second plate is even in each of the inner and outer surfaces.

10. A liquid lens, comprising:
a second plate and a third plate, the second plate and the third plate being transparent;
a first plate disposed between the second plate and the third plate, the first plate comprising an open region having a predetermined inclined surface;
a cavity defined by the second plate, the third plate, and the open region; and
two liquids charged in the cavity, the two liquids having different properties from each other,
wherein the second plate comprises:
a bonding region bonded to the first plate;
a center region formed corresponding to the open region; and
a peripheral region spaced apart from the first plate, the peripheral region being located between the bonding region and the center region,
wherein a first thickness of the center region is larger than a second thickness of the peripheral region so that a degree of warping of the center region in response to a change in temperature is small, and
wherein a third thickness of the bonding region is larger than the second thickness, and is equal to or larger than the first thickness.

11. The liquid lens according to claim 3, wherein the first region protrudes further than the second region in the outer surface.

12. The liquid lens according to claim 3, wherein the first region protrudes further than the second region in each of the inner and outer surfaces.

13. The liquid lens according to claim 3, wherein the first region and the second region are even and the third region protrudes further than the first region, in the outer surface.

14. The liquid lens according to claim 3, wherein the second plate comprises an inner surface, which is in contact with one of the conductive liquid or the non-conductive liquid, and an outer surface formed opposite the inner surface, and wherein one of the inner surface and the outer surface is uneven, and the other of the inner surface and the outer surface is even.

15. The liquid lens according to claim 7, wherein the third plate is even.

16. The liquid lens according to claim 7, wherein the third plate is uneven.

\* \* \* \* \*